United States Patent [19]

Morris

[11] Patent Number: 4,463,551
[45] Date of Patent: Aug. 7, 1984

[54] ROTARY PRIME MOVER

[76] Inventor: Harold Morris, 6 Sherwood Dr., St. John's, Newfoundland, Canada, A1E 2X4

[21] Appl. No.: 484,696

[22] Filed: Apr. 19, 1983

Related U.S. Application Data

[63] Continuation of Ser. No. 203,105, Nov. 3, 1980.

[51] Int. Cl.$^3$ .............................................. F02C 3/16
[52] U.S. Cl. ................................................. 60/39.35
[58] Field of Search ........................... 60/39.35, 39.34; 416/21, 22; 415/80, 81, 82

[56] References Cited

U.S. PATENT DOCUMENTS

| 2,509,359 | 5/1950 | Margolis | 416/21 |
| 2,709,889 | 6/1955 | Mount | 60/39.35 |
| 2,795,283 | 6/1957 | Bennett | 416/22 |
| 2,890,570 | 6/1959 | Castles, Jr. | 60/39.35 |
| 3,085,399 | 4/1963 | Kitchens | 60/39.35 |
| 3,541,787 | 11/1970 | Romoli | 60/39.35 |
| 3,699,771 | 10/1972 | Chelminski | 60/39.35 |
| 3,804,549 | 4/1974 | Kellenbarger | 60/39.34 |

FOREIGN PATENT DOCUMENTS

| 117440 | 3/1909 | Canada . |
| 252119 | 7/1925 | Canada . |

Primary Examiner—Louis J. Casaregola
Assistant Examiner—Jeffrey A. Simenauer
Attorney, Agent, or Firm—Birch, Stewart, Kolasch & Birch

[57] ABSTRACT

A novel rotary prime mover is provided having a generally cylindrical casing including an axial air intake, an axial exhaust outlet and bearing means at each circular end thereof to support a longitudinally arranged shaft. A flywheel block is rotatably mounted within the casing on the longitudinally arranged shaft and is arranged intermediate the air inlet and the exhaust outlet. The longitudinal shaft has a fuel inlet passage concentrically bored therethrough. The flywheel block includes at least two balanced diametrically opposed jet reaction engines recessed and secured in a specifically recited manner at the circumferential edge thereof. Each jet reaction engine is of a specified cylindrical construction to provide an adjustable ignition head, having air inlet passages and an ignition device associated therewith, an adjustable exhaust liner, a fuel infeed zone fed by a fuel inlet connected to the fuel inlet passage to feed fuel automatically to a combustion zone, and a source of ignition power connected to the ignition device through the casing. In this way, operation of the jet reaction engines causes powered rotation of the flywheel block, so that power may be taken off the shaft. Thus, there is now provided a simple prime mover having a minimum of moving parts, in which the rotary member, the jet reaction member and the stationary casing are so interrelated as to provide an ultimate efficient engine.

17 Claims, 4 Drawing Figures

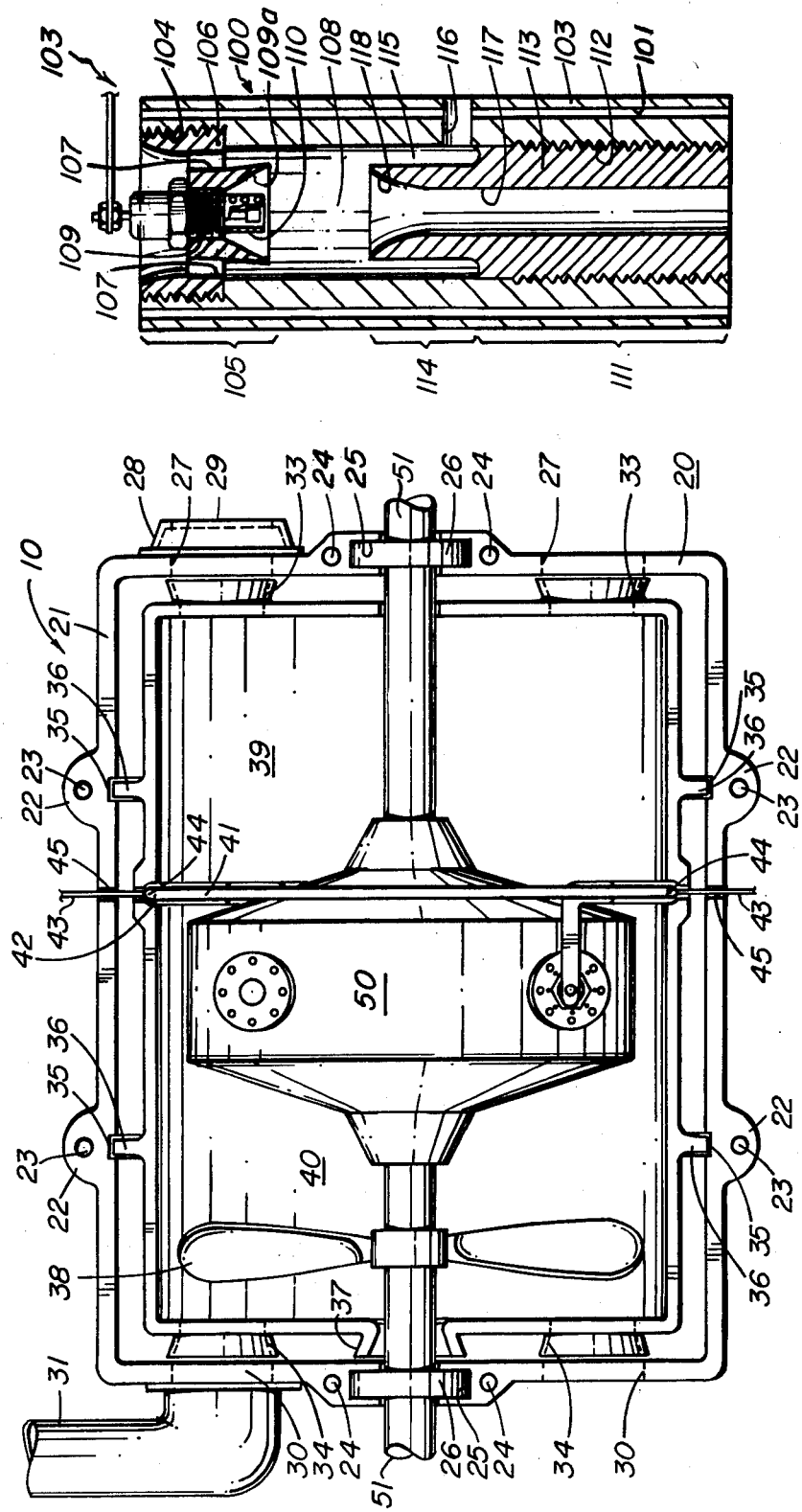

ROTARY PRIME MOVER

This application is a continuation, of application Ser. No. 203,105 filed on Nov. 3, 1980.

BACKGROUND OF THE INVENTION (i) Field of the Invention

This invention relates to a rotary prime mover or engine including a flywheel block having at least one pair of opposed jet reaction engines therein which, when operative, cause rotation of the flywheel.

(ii) Description of the Prior Art

This general type of rotary prime mover is well known in the art. Canadian Pat. No. 117,440 issued Mar. 23, 1909 to Charles Brent provides a rotary engine comprising a suitably mounted rotatable cylinder. The cylinder has a dishcarge orifice, means for supplying a charge to the cylinder, means for igniting the charge within the cylinder, and means for baffling the ignited charge within the cylinder.

Canadian Pat. No. 252,119 issued July 28, 1925 to Donald L. Sellman provides a compressor for use in combination with an engine. The compressor is adapted to be connected to a source of fuel supply and includes means connecting the compressor with the engine cylinder. A force fan is mounted upon and is operated by the drive shaft of the engine for forcing fuel under compression to the engine. A suction fan is mounted upon and is operated by the driven shaft and is in communication with the exhaust ports of the engine to suck out the exhaust gases. A crank arm is provided in the drive shaft for operating the compressor.

Canadian Pat. No. 508,948 issued Jan. 11, 1955 to W. W. Mount is directed to a reaction burner power generator. In general, in accordance with the invention described in that patent, a comparatively large power wheel was provided having a centrally disposed shaft adapted to turn at as high a peripheral speed as is practical. On the periphery of this wheel, a plurality of reaction power cells or jet thrust burners, which may be ram jet motors or rocket motors, were mounted. Surrounding the power wheel and positioned to receive the hot exhaust gases from the jet thrust burners was an annular boiler. The heat from the exhaust gases was then utilized to generate steam. The shaft of the power wheel was connected to a suitable power converter, such as an electric generator, to convert the energy of rotation of the wheel, created by the net thrust of the jet thrust burners, into usable power. The power generated from the utilization of the exhaust gases was preferably utilized to produce added thrust upon the shaft of the power wheel or upon an associated member driven by the shaft of the power wheel. The compounding of these power outputs was said to provide a total power output appreciably greater than that obtained in conventional power generating installations from equivalent amounts of fuel.

Canadian Pat. No. 653,226 issued Dec. 4, 1962 to J. M. Carswell provides an improvement in jet reaction prime movers of the type disclosed in his U.S. Pat. No. 2,637,166 granted May 5, 1953, in which the reactions of high velocity jets are utilized to effect rotation of a motor to provide output shaft power. The patentee provided a jet reaction prime mover comprising a rotor in the form of a blade element supported to rotate about a central axis within a casing and having a combustion chamber at each end thereof. Each of the combustion chambers has oppositely disposed discharge nozzles leading therefrom to direct products of combustion from the chambers in opposite directions substantially tangentially of the rotational path of the blade element to effect rotation thereof. The casing opens to the atmosphere through a discharge throat formation. The blade element decreases smoothly and continuously in cross-sectional area. The blade element has a pair of slots therein disposed on opposite sides of the rotation axis and on opposite sides of the blade. Each slot formation extends substantially from the axis of rotation to adjacent to the combustion chamber discharge nozzles on its respective side of the blade. Finally, each of the slots is progressively wider and deeper along its length outwardly from the rotation axis and each terminates at its outward end in a wall defining one wall of the adjacent combustion chamber discharge nozzle.

Canadian Pat. No. 967,380 issued May 13, 1975 to M. Eskeli was alleged to provide a simplified and efficient apparatus for generating power. The device for generating power responsive to flow of fluid therethrough includes (a) a power shaft journalled for rotation in a suitable support for transmission of power; (b) a particularly defined rotating compressing centrifuge rotor equipped with a plurality of reaction nozzles carried on such shaft for generating the power; and (c) a casing sealingly surrounding the compressing centrifuge rotor, the casing defining a passageway surrounding the compressing centrifuge rotor for collection of the effluent fluid.

Kitchens, U.S. Pat. No. 3,085,399 patented Apr. 16, 1963, provides a rotary jet engine. Such rotary jet engine comprises a main housing having air inlet and outlet passages, an output shaft journalled in the main housing, and a rotor secured on the output shaft and having outwardly projecting compressor vanes. An inner housing is rotatably mounted on the shaft and has air inlet means opening into the main housing adjacent the air inlet passages, with a space being provided between the inner housing and the rotor. Outwardly projecting rigid conduits are secured to the inner housing and they communicate with the space between the inner housing and the rotor. Respective jet combustion chambers are mounted on the ends of the conduits, the chambers having venturi air intake elements communicating with the conduits and having air scoop portions at their forward ends communicating with the venturi elements. Fuel ignition means are provided in the jet combustion chambers. The jet combustion chambers have exhaust conduits at their rear ends adjacent the outlet passages, with the chambers being positioned substantially normal to radii of the output shaft, in order to effect rotation of the chambers by jet reaction. Means are provided which gearingly couple the inner housing to the output shaft. Finally, means are provided to admit liquid fuel into the space between the inner housing and the rotor.

Olenger, U.S. Pat. No. 3,145,533 patented Aug. 25, 1964, provided an improved rotary internal combustion engine. The rotary engine comprises a stator having an enclosed compartment within which a cylindrically shaped rotor structure may turn. The rotor structure includes a number of combustion chambers each having an exhaust nozzle directed toward the rotor periphery at an angle such that exhaust gases from the nozzle develop a rotation producing, thrust component. The combustion chambers are charged with a controllable combustible gas which is ignited intermittently to provide power and control at low engine speeds. The inner peripheral surface of the stator compartment includes thrust reaction surfaces which gradually give way to exhaust ports which extend from the inner compartment to the outer surface of the stator in the vicinity of each of the reaction surfaces. Means are provided to inject fuel into each combustion chamber and to ignite the fuel at the instant its respective exhaust nozzle is directed against one of the periodically disposed reaction surfaces. At ignition, the initial burning of the gases in the combustion chamber causes a pressure transient which propagates through the nozzle and against the reaction surfaces of the stator to induce rotation of the rotor element. As rotation continues and the gases in the combustion chamber become entirely burned, they are permitted escape in increasing quantity through the variable opening to the exhaust port. This was alleged to result in a jet-type thrust in the rotor which enhances the initial reaction effect.

Romoli, U.S. Pat. No. 3,541,787 patented Nov. 24, 1970, provides a self-compressed continuous circular internal combustion engine, requiring only an auxiliary starting means for bringing it to a starting speed of rotation, thereafter the engine keeping self-compressed and when hot also self-ignited, and operating as a pure jet or pulse-jet engine. The patentee provided a rotary internal combustion engine of the toroidal type having combustion chambers with jet exhausts arranged to produce rotary movement within a continuous toroidal cavity. The engine includes means for radially feeding a substantial quantity of air at essentially atmospheric pressure into the toroidal cavity and directly into the path of the rotating combustion chambers. The rotating combustion chambers are so designed that they substantially fill the cross-sectional area of the toroidal cavity. They also have venturi-shaped inlets to impart increased velocity to the inflowing air, and subsequent expansion of the inflowing air, thereby decreasing its velocity, with a corresponding rapid and substantial increase in pressure. Means are provided for burning fuel in the compressed air in the chamber. Finally, means are provided for rotating the rotating combustion chambers to a sufficient rotary speed to provide a continuously operating rotary internal combustion engine, whereby the rotary motion of the chambers and venturi inlets, and the walls of the toroidal cavity provide the necessary substantial compression of the inflowing air.

Miyada U.S. Pat. No. 3,956,888 patented May 18, 1976, provided a coaxial rotary engine which has comparatively small number of moving and stationary parts. It is made in a compact configuration, which comprises a pair of rotors, which contain pistons and primary compressing chambers in their peripheral sections. A stationary central cylindrical wall is provided that supports and holds leak-proof gates which open and close at proper times without direct human or electronic help, and against which the pistons compress gases. High pressure compressing chambers are provided with automatic inlet and outlet ports. Compact combustors are provided with automatic ignition devices. Each of its pistons is constructed in a long arcuate shape. A passageway connects the opening to a compressing chamber located inside the piston. An automatic outlet port opens at regular intervals to release compressed gases into the combustor located further inside each piston. After being compressed by the action of each piston against a closed gate and a closed outlet, the gases pass from the compressing chambers, via an automatic outlet, into each combustor, where they are ignited. The resulting expanding gases rushing out of the combustor's terminal opening strike a closed gate, and the rotor, which holds the piston which in turn contains the combustor, spins by reaction. Thus, the kinetic energy of the expanding gases is converted into a usable rotary motion.

In spite of these many rotary engines, the structure of the ram jet combustion chamber has received scant attention.

Canadian Pat. No. 616,597 issued Mar. 21, 1961 to H. L. Magill provides a radial flow, single stage, reaction turbine. The patented reaction turbine includes a rotor having a central hub chamber. A pure reaction nozzle is mounted on the rotor at the outer region thereof and projects outwardly beyond the periphery of the rotor, the nozzle being provided with a radially directed fluid inlet and a pair of fluid outlets in communication with the fluid inlet, the fluid outlets being directed generally perpendicular to the radial direction of the inlet and facing in opposite directions. Means are provided for selectively closing the fluid outlets of the nozzle. Means are provided for establishing communication between the fluid inlet and the central hub chamber. Finally, means are provided for supplying motive fluid under pressure to the central hub chamber.

Canadian Pat. No. 882,985 issued Oct. 12, 1971 to R. C. Evans provided an improved ram jet engine which has an inlet for capturing ram fluid such as air and a nozzle for discharge of fluid from the engine. The engine comprises a housing which has an upstream end and a downstream end. Plug means extend from the downstream end of the housing. At least one inlet duct provides a flow path for ram fluid from the aircraft inlet to the downstream end of the housing. The outlet end of the inlet duct generally conforms to and joins the downstream end of the housing whereby the housing is positioned outside of the flow path formed by the duct. A generally annular duct extends from the juncture of the housing and the inlet duct to form, in combination with the plug means, an annular flow path of progressively varying area for pressurizing the ram fluid. Means are provided for increasing the energy level of the pressurized ram fluid. Outlet duct means, downstream of the annular duct, accelerate the fluid for discharge through the aircraft nozzle to produce a propulsive thrust. The plug, therefore, is supported outside of the inlet duct flow path and the area of the plug exposed to the ram fluid is minimized.

Adams, U.S. Pat. No. 3,341,129 patented Sept. 12, 1967, provided a rocket nozzle which included a set of rocket motor exhaust nozzles or nozzle portions, each of which has a given axial thrust level which is different from the axial thrust level of each of the other nozzles or portions of the set. The total effective exhaust area of each nozzle must be equal to a fixed value. The set of exhaust nozzles includes a plurality of interchangeable conical members removably mounted downstream and spaced from the throat portion of a rocket motor exhaust nozzle with the apex of the conical portion facing toward and being coaxial with the nozzle throat. The particular thrust level desired is achieved by merely selecting the proper conical member and assembling it on mounting means formed as part of the exhaust end of the rocket motor.

De la Foute et al, U.S. Pat. No. 3,526,094 patented Sept. 1, 1974, provided a ramjet engine having a plurality of combustors mounted on a rotary carrier and retractable air and exhaust deflectors to permit operation at subsonic speed.

Ghougasion, U.S. Pat. No. 3,533,239 patented Oct. 13, 1970, provided a reaction thrust engine operating as a pulse jet below an upper speed limit, is converted to ram jet operation above this speed limit in the subsonic and supersonic speed ranges by variable geometry intake means and rearward shift of a flow restricting nozzle throat formation. A check valve assembly necessary for pulse jet operation is displaced from an operative position at the entrance to the combustion zone in order to accommodate ram jet operation.

(iii) Deficiencies of the Prior Art

Thus, internal combustion engines hitherto devised still have considerable drawbacks, in spite of the numerous studies and improvements made thereto. Rotary engines provided up to now incorporated many inconveniences of seal, high consumption, poor pickup, wear of many parts which inconveniences have not yet been overcome. Turbine engines were found to be unsuitable for an application on conventional motor vehicles because of their cumbersomeness, consumption, necessity of sound and heat shielding parts, and the impossibility of operating under certain minimum dimensions and power. Jet engines for motor vehicles provided other problems, e.g., high fuel consumption, noise, and high power output required for their starting. Both turbine and jet engines are not suitable for adaptation to motor vehicles, due to the necessity of providing air compression devices and many shielding members with their attendant increase in weight, size and costs.

Rotary engines, as distinguished from the more conventional reciprocating type engines, operate on the principle of the direct action or reaction of expanding gases upon a rotary element in a manner which causes it to turn. A major advantage of rotary engines over reciprocating type engines accrues from their inherent structural simplicity, whereby the noise, wear and complexity caused by the various moving parts of reciprocating engines, such as reciprocating valves, pistons, rocker arms, etc. are eliminated. A well-known type of rotary engine is the gas turbine, but gas turbines, in their present state of development, are incapable of producing useful output power except at extremely high speeds. This results in limited application as well as unusually severe design restrictions. A further disadvantage of the gas turbine is the difficulty with which its speed may be controlled.

SUMMARY OF THE INVENTION (i) Aims of the Invention

Applicant proposes to provide a rotary engine which does not have the disadvantages of a reciprocating internal combustion engine and which is simple to construct and operate. Applicant thus proposes to provide a rotary engine which will provide substantial amounts of controllable power at low as well as at high speeds and which has other advantages as compared to known types of rotary engines.

The rotary engine proposed by this invention is relatively simple in construction; provides high output; provides smooth and efficient operation; involves relatively inexpensive components; is rugged in construction; is extremely economical in utilization of fuel; is relatively compact in size; has high capacity; is relatively light in weight in proportion to the power rating thereof; is easy to assemble; and is provided with self-contained means for thoroughly and efficiently mixing the fuel and air admitted thereto to provide the proper combustible mixture for operating the engine.

In spite of the many prior art rotary jet engines, jet-thrust internal combustion engines, rotary internal combustion engines, mixed fluid turbines, reaction burner power generators, reaction turbines, rotary engines and jet reaction prime movers, there still exists the need, and applicant proposes to, provide a simple such engine, having a minimum of moving parts, in which the rotary member, the jet reaction member and the stationary casing are so interrelated as to provide an ultimate efficient engine.

(ii) Statement of Invention

By this invention, this prime aim is achieved by a rotary prime mover comprising: (A) a generally cylindrcal casing, the casing including an axial air intake, an axial exhaust outlet, and bearing means at each circular end thereof to support a longitudinally arranged shaft; (B) a flywheel block mounted on the longitudinally arranged shaft and arranged intermediate the air intake and the exhaust outlet, the longitudinal shaft having fuel passage therethrough, the flywheel block having a main cylindrical section of slightly less diameter than the diameter of the generally cylindrical casing; at least two balanced, diametrically-opposed jet reaction engines recessed within and secured within the cylindrical section of the flywheel block, each being disposed along a chord of the main cylindrical section, each jet reaction engine comprising (i) a hollow cylindrical housing, (ii) a cylindrical ignition head threadedly longitudinally adjustably secured at one end of the housing, the ignition head having an air inlet throat leading to a plurality of circumferentially disposed, longitudinally extending air inlet passages, and a central bore accommodating an ignition device, (iii) an exhaust liner threadedly longitudinally adjustably secured at the other end of the housing, the liner having a central longitudinally extending exhaust passage having an exhaust gas inlet throat, (iv) a fuel infeed zone, (v) a radial fuel inlet for admitting fuel to the fuel infeed zone, and (vi) a combustion zone within the housing disposed between the ignition head and the exhaust liner; a fuel infeed line within the flywheel block connected between the radial fuel inlet to the fuel infeed zone and the fuel passage through the longitudinal shaft, the fuel infeed line including automatically actuated valve means therein; and a source of ignition power connected to the ignition device through the casing; whereby operation of the jet reaction engines causes powered rotation of the flywheel block, so that power may be taken off the shaft.

(iii) Other Features of This Invention

By one important feature of this invention, the rotary prime mover is such that, in the jet reaction engine, the ignition head has an outwardly flared air inlet throat, and the interior of the central bore of the ignition head flares outwardly; the exhaust liner has an outwardly flared exhaust gas inlet throat; the fuel infeed zone is a cylindrical annular zone disposed between the internal wall of the cylidrical housing and the external wall of the exhaust liner; and the combustion zone extends between the ignition device at the outwardly flared bore of the ignition head, and the outwardly flared exhaust inlet throat of the exhaust liner.

By one feature of this invention, the longitudinal shaft is solid and is longitudinally centrally concentrically bored to accommodate a fuel passage.

By a further feature of this invention, the automatically activated valve means comprises a spring biased ball valve.

By yet another feature of this invention, the flywheel block includes a fuel inlet bore, the bore containing a valve means therein, the valve means comprising a spherical ball maintained in position by a compression biasing spring.

By a further feature of this invention, the casing includes upper and lower identical portions, each provided with at least two air inlet ports covered by air filter means, and at least two exhaust outlets, each connected to an associated exhaust pipe.

By another feature of this invention, the casing includes an outer housing and an inner heat-insulating casing, the casing including frusto-conical air inlet leading from the air inlet ports to the inlet side of the casing, and exhaust outlet ports leading from the exhaust side of the casing to the exhaust outlets.

By yet another feature of this invention, the rotary prime mover includes means protecting the bearings from the heat of the exhaust.

By still another feature of this invention, the rotary prime mover includes fan means to draw into the casing and to expel exhaust gas from the casing.

By a still further feature of this invention, a space is provided between the outer housing and the inner casing, thereby to maintain sound output levels to a minimum and to reduce transfer of heat between the inner casing and the outer housing.

By a further feature of this invention, the flywheel block is in the shape of a central cylindrical portion, and a pair of lateral, frusto-conical portions, the flywheel block including a balancing means thereon.

By a still further feature of this invention, the flywheel block is secured to the longitudinal shaft by set screw means.

By another feature of this invention, the rotary prime mover includes O-rings to provide a fuel seal between the longitudinal shaft and the flywheel block.

By a further feature of this invention, the fuel inlet includes a central longitudinal fuel passage in the solid longitudinal shaft, and at least two fuel passages extending radially outwardly from the central longitudinal fuel passage and transversely through the solid shaft to an associated coextensive fuel passage extending radially within the flywheel block to an associated well within which an associated jet reaction engine is secured.

By another feature of this invention, each coextensive fuel inlet passage includes a small diameter bore leading to a larger diameter bore adjacent the well, the larger diameter bore containing a ball valve means and a valve control compression spring.

By yet another feature of this invention, the well includes a circumferential abutment ledge to retain the forward input end of the jet reaction engine.

By yet a further feature of this invention, the ignition means includes a spark or glow plug connected by a whisker wiper electrode to an electrical contact wiper on the inner circumference of the casing.

By another feature of this invention, the electrical contact wiper comprises a slip ring, which may be water cooled, within the casing.

By yet another feature of this invention, the jet reaction tubular body includes a plurality of longitudinally extending air cooling passages therethrough.

BRIEF DESCRIPTION OF THE DRAWINGS

In the accompanying drawings,

FIG. 1 is a central longitudinal section through the prime mover of an embodiment of this invention in which the flywheel block rotatably mounted within the casing is shown in plan and with the upper portion of the casing removed for clarity;

FIG. 4 is a central longitudinal section through a jet reaction engine providing one embodiment of this invention.

Figure 3:
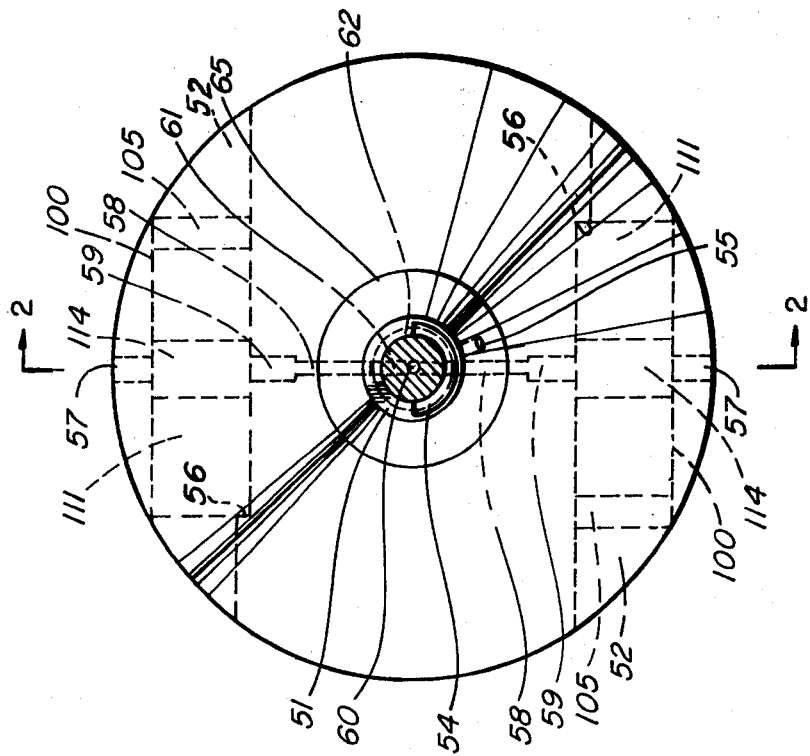
FIG. 3 is a end view of the flywheel block used in an embodiment of this invention.

DESCRIPTION OF PREFERRED EMBODIMENTS (i) Description of FIG. 1

As seen in FIG. 1, the rotary prime mover 10 includes a rotary flywheel block 50 rotatably mounted within a casing 20 by means of shaft 51. The construction of the rotary flywheel block 50 will be described later.

The casing 20 is preferably cast out of a suitable metal, e.g., iron, aluminum, magnesium, etc., and is formed of a lower outer half 21 (as seen). The lower outer half 21 and the upper outer half (unnumbered) are each provided with ears 22, having registering bolt holes 23 so that the two halves may be assembled. Additional registering bolt holes 24 are provided for further securing of the two halves and permits a more critical adjustment of the casing 20 near the bearings. The top half is shaped such that the perimeter of the junction of the two halves forms a lap joint that secures against leaks and reduces manufacturing tolerances. The lower, outer half 21 of the casing 20 has a means for mounting the entire casing 20 to the frame of the device it is to power (not shown). Since the lower outer half 21 and the upper outer half (unnumbered) of the casing 20 are identical, only the lower, outer half 21 will be described now.

The casing 20 is provided with a pair of longitudinally opposed wells 25, in each semi-circular end wall along the central longitudinal axis thereof, to provide a seat for anti-friction bearings 26 that support shaft 51. The housing 20 includes a pair of air intake ports 27, each fitted with a cover 28, supporting a disc 29 of air filtering material. While each half of the housing 20 contains two such filtering arrangements, only one is shown in its entirety in the drawing in order to simplify the drawing. The housing also includes a pair of exhaust outlets 30 each of which is connected, in the usual manner, to a flanged exhaust pipe 31. While each half of the housing 20 contains two such exhaust arrangements, only one is shown in its entirety in the drawing in order to simplify the drawing. These exhaust pipes 31 may be arranged in manifold fashion to form the complete collection of exhaust gases by coupling to the other exhaust holes in the housing.

Within the housing 20 is an inner casing or lining 32. This lining 32 is also formed in two halves (as is the housing 20) but for ease of illustration only the bottom half is shown and will be described. The inner casing or lining 32 preferably is spaced from the housing 20 so as to accommodate insulation (if required) between it and the outside housing to maintain an acceptable temperature and sound level. It should be made of a suitable heat-resisting material with electrical and heat-insulating properties and should also be capable of efficiently directing the intake of air and the exhausting of the exhaust gases in the most effective manner. The inner casing is thus preferably made of molded asbestos or a suitable ceramic material, e.g., that known by the Trade Mark of CORNING WARE. One end of the lining 32 is provided with a pair of frusto-conically shaped intakes 33 to direct intake air from the air intake ports 27 into the casing 20. The other end of the lining 32 is provided with a pair of frusto-conically shaped outlets 34 to direct the exhaust gases from the interior of the casing 20 to the exhaust outlets 30.

In order to secure the inner casing or lining 32 to the casing 20, the casing 20 is provided with two spaced-apart circumventing interior channels 35, which are sized snugly to accept spaced-apart ribs 36 that encircle the exterior of the interior casing 32 and are integral with it. The channel 35/rib 36 arrangement is such that it provides support and alignment of the inner casing 32 with respect to the casing 20 while, at the same time making a minimum surface contact in the interest of low heat and sound transfer by conduction. Conically shaped protrusion 37, on the exhaust end of the inner casing 32, is located and shaped such that bearing 26 is protected from directed impingement by the exhaust gases. Air inflow and exhaust outflow may be caused and controlled by a fan 38 that is rigidly attached to shaft 51.

While the air inflow and exhaust outflow is shown to be provided and controlled by the fan 38, other or auxiliary means may be provided. Thus, multi-step compressor fan blades may be secured to the air intake region of shaft 51 to provide a feed of compressed air to the jet reaction motors (to be described later). Also the region of the casing diametrically opposite the jet reaction motors may be provided as an internal spiral channel leading from the air inflow side 39 of the casing to the exhaust outflow side 40 of the casing. The obtaining of a suitable air mixture and the maintaining of satisfactory exhausting will determine the design and the use of one or two fans both in the exhaust outflow side 40 and in the air inflow side 39.

In order to provide contact ignition for the spark plugs or the glow plugs of the jet reaction motor, a circular slip-ring or ignition ring (hereinafter simply termed ring) 41 consisting of a hollow or square tube or of plate-type form, and having a smooth surface or face is inset in the inner casing 32 in a channel 42 that is molded in the inner casing 32. This ring is located away from the center of the ram jet outputs to prevent or reduce undue temperature rise. If necessary, further control of the temperature of the ring 41 may be obtained by inducing a steady flow of water or coolant through the ring 41 (if it is hollow). This flow would be directed to enter and leave via pipes 43 that are fused to the ring 41 at the terminal poles 44. Semi-circular openings 45 in the housing provide access for pipes 43 and slip-ring 41.

Figure 2:
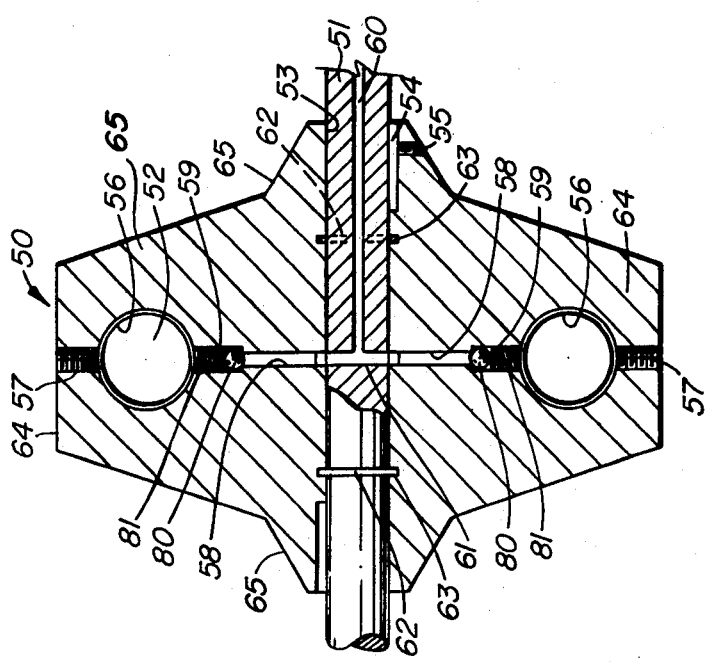
FIG. 2 is a central longitudinal section through the flywheel block shaft and ball valve assembly.

(ii) Description of FIGS. 2 and 3

As stated before, the rotary flywheel block 50 is rotatably mounted within housing 20 by shaft 51 turning on anti-friction bearings 26. Now, as seen in FIG. 2, the rotary flywheel block 50 includes a central, generally cylindrical portion provided with a pair of diametrically opposed cylindrical wells 52 extending along chords of the circle defining such cylinder to contain housings 103 (see FIG. 4) of jet reaction engines 100. A longitudinal bore 53 is provided snugly to embrace solid, bored shaft 51 which is secured to the flywheel block 50 by the use of keyway 54 and set screws 55 or a spline (not shown) on the power end so as not to interfere with the internal fuel feed system incorporated in the flywheel block 50. Each housing 103 is maintained in proper position within the flywheel block 50 by abutment against annular shoulders 56 and through use of set screws 57. The positional alignment of the housing 103 as described is necessary to ensure an undisturbed free passage of fuel between internal radial fuel bore 58 connected to transverse fuel bore 61 in shaft 51 and larger valve-containing central radial fuel bore 59. With reference to FIG. 2, it is seen that longitudinal shaft 51 is solid and is concentrically longitudinally bored to accommodate a fuel passage 60. Thus, a fuel passage 60 is provided through the center of longitudinal shaft 51, fuel passage 60 extending along the central longitudinal axis of solid shaft 51 only as far as, and joining, transverse bore 61. Fuel passage 60 thus meets transverse bore 61 in the shaft 51 to form essentially a T-junction. The transverse fuel bore 61 is aligned with the coextensive axial fuel bores 58 and 59. Larger fuel bore 59 contains ball 80 that is held under controlled pressure by compression spring 81. The spring 81 may be retained and made adjustable by a bored retaining part (not shown) that is threaded externally to mate with a threaded portion of large radial fuel bore 59. Large radial fuel bore 59 communicates with fuel aperture 116 in housing 103. Other means may alternatively be used to serve the same purpose of retaining the ball valve mechanism. When the block 50 is stationary, compression spring 81 maintains ball 80 against the outlet of fuel bore 58 to prevent fuel flow into large radial fuel bore 59 and hence jet reaction motor 100. Under the centrifugal force of rotation, the ball 80 is urged outwardly along large radial fuel bore 59 partially to overcome the bias force of spring 81, thus permitting entry of fuel as required in relation to the rotary speed of the motor block 50. This provides a simple yet effective means of supplying fuel to jet reaction engine 100. Connected to fuel passage 60 is a fuel feed line (not shown) which subsequently connects to a fuel container means having a manually adjustable fuel flow valve that meters the rate at which the fuel is fed to the jet reaction engines. This determines and controls the rotary speed of the flywheel block 50 under given degrees of shaft loading and developed power output. O-rings 62 provide an effective fuel seal between longitudinal shaft 51 and flywheel block 50 and are arranged to fit in notches 63 in the flywheel block 50 and in mating grooves in longitudinal shaft 51.

The flywheel block 50 is, as described above, in the form of a a central cylindrical portion 64, through which bores 52 extend, and lateral, stepped, frusto-conical ends 65, which assist in the movement of intake air within air inflow side 39, and exhaust gases within exhaust outflow side 40 (see FIG. 1).

(iii) Description of FIG. 4

Turning now to the jet reaction motor 100 shown in FIG. 4, cylindrically shaped housing 103 is internally threaded 104 on one end 105 to accommodate an ignition head 106 which is threadedly longitudinally adjustably secured therein. Ignition head 106 includes a main cylindrical body portion provided with an outwardly flared air inlet throat leading to appropriately sized and positioned circumferentially disposed longitudinally extending air intake passages 107 therethrough to permit entry to the combustion chamber 108 the air required for combustion of the fuel. The rate at which air enters through passages 107 is controlled by a disc-shaped metal reed valve (not shown), which is securely fastened to the inner (combustion chamber) end of the ignition head 106. The disc-shaped reed valve is constructed such that it will automatically flex under forces created by a decrease in pressure in the combustion chamber 108 in a manner suitable for the intake of the correct amount of air for a given fuel flow. The ignition head 106 has an internally threaded bore 109 to accept glow plug 110 or other similar ignition devices. The interior of bore 109 flares outwardly at 109a.

The opposite end 111 of the housing 103 is threaded 112, to accommodate an exhaust liner 113 which is threadedly longitudinally adjustably secured therein. The exhaust liner 113 is provided with a portion 114 of lesser diameter to provide, between the external wall thereof and the interior wall of housing 103, a cylindrical but annular fuel admission zone 115 leading to the combustion zone 108. The fuel is admitted by centrifugal force from the respective fuel bores 60, 59 and 58 to a radial fuel apertures 116 in the wall of the housing 103. The exhaust liner 113 is bored to provide a central essentially longitudinally extending exhaust bore 117, with one end of the bore 117 flared as a wide exhaust gas inlet throat 118 to permit undisturbed passage of exhaust gases during operation. The combustion is supported, and the temperature of the combustion chamber 108 is maintained within prescribed maximum limits by the flow of air through longitudinally extending cooling passages 101 bored through the cylindrically wall of housing 103.

OPERATION OF PREFERRED EMBODIMENTS

Thus, it is seen that a simple, efficient rotary prime mover is now provided. The invention includes as essential features jet reaction engines which are contained in, and are functionally integral with, a flywheel block which is suitably rotatably supported such that the jet reaction engines cause the flywheel block to rotate on a shaft mounted in bearings. The shaft is arranged such that the energy developed by the jet reaction engine exhaust thrust can be coupled to provide low vibration motive power for vehicles or other devices that require energy.

The present invention is attractive for a wide variety of uses when compared with other well-known engines. The selection and orientation of jet reaction engines results in the full utilization of every part of each revolution of the engine insofar as the development of thrust is concerned. Inasmuch as the integral parts of the engine move only in one rotary direction, without any reciprocating motion, the resulting stresses on the parts of the engine are considerably reduced.

This structure provides a mechanical design that is simple and less expensive than conventional engines which generate comparable horsepower. The present rotary prime mover has a minimum number of moving parts. Those parts which provide the thrust to the rotary prime mover are essentially made into one part that does not itself move relative to the rotary flywheel. Only a rotary movement of a shaft with respect to bearings is provided. The advantages of fewer parts, and in particular fewer moving parts, include lower manufacturing costs and lower maintenance costs.

Without modification, the rotary prime mover is suitable for mounting and operating in any position and thereby permits power takeoff that is suitable for most requirements. Additionally, a common shaft and fuel feed system can readily be combined with more than one rotary prime mover unit to increase power output and further to reduce vibration from the combinational unit. The flywheel block of the rotary prime mover may be shaped in a form that would best take advantage of maintaining engine temperature within prescribed acceptable limits by virtue of the flow of air through and about the flywheel block and the housing or casing.

The jet reaction engine combined with the glow plug and centrifugal coaxial fuel feed arrangement permits the use of a variety of fuels that may be used with a minimum requirement for adjustment of the fuel feed system to compensate for a change in fuel type. Further, the utilization of the glow plug means of fuel ignition reduces the complexity of the ignition electrical requirement to that of a low voltage electrical power source that does not require modification to another voltage level in order to start and run the rotary prime mover. The fuel supply to the combustion chambers, fed by coaxial centrifugal force, is regulated by a simple fuel feed valve which, by nature of its simplicity, further reduces carburetor requirements and cost. The centrifugal force of the rotating flywheel block of the rotary prime mover acts to cause the fuel to be injected into the jet chamber and prepares it for efficient combustion with the air entering the chamber from suitable openings in the ignition heads.

It is also clear that the rotary prime mover of this invention does not require lubricating oil in the sense that such oil is required by conventional internal combustion engines. The jet reaction engine and its exhaust gases provide thrust. The combustion thus does not result in relative mechanical movement between metal parts as in other engines. The shaft with the attached flywheel block and jet reaction engine assembly is mounted in bearings which are selected for operation under both radial and axial loads. These bearings preferably are permanently lubricated and sealed. Further, a malfunction of one jet reaction engine would not result in a termination of power outputs. While each jet reaction engine operates cooperatively and compatibly under normal engine use, they nevertheless have an independence such that, should failure occur, the change in engine operation would be restricted solely to a lower power output under a given fuel supply rate.

The rotary prime mover proposed by this invention may be used in the place of conventional steam-electric generating installations. In such installations, only the heat transferred to the boiler water is utilized to produce usable power. In many conventional steam-electric generating plants, the overal efficiency, i.e., the ratio of the net power available externally of the plant to the theoretical power available from the input fuel, is relatively low as many losses are encountered in the conversion of steam to usable power. In such an installation an overall efficiency of 34% is an acceptable high figure, with many installations operating at an overall efficiency appreciably below this value. In such a system, using conventional fuel burners, the increase in volume of the combustion gases, due to burning alone, produces no useful work except, perhaps, to increase slightly the draft of the furnace.

This present invention provides a rotary power generator, peculiarly adapted to the generation of power in large installations, wherein the energy of motion obtained by utilizing the momentum forces set in motion by the combustion of fuel and air in ram jet motors, or by the combustion of fuel and oxidizer in rocket motors, is compounded with the energy obtained from the conversion of the high temperature exhaust from the jet motors into steam, to produce a total amount of usable power appreciably greater than that produced from an equivalent amount of fuel in a conventional power generation installation.

The reaction jet engines mounted within the periphery of the flywheel block will deliver great amounts of power at great peripheral speeds. The ram jet motors are designed to operate at a predetermined air intake speed.

When jet thrust burners burn fuel and a compressed mixture of fuel and oxidizer in a confined space, the increase in gas volume resulting from the combustion is utilized to develop reaction forces for the production of mechanical energy. The amount of heat utilized in producing thrust in the ram jet motors or in rocket motors is converted into mechanical energy at very high efficiencies. The remainder of the heat available from the combustion of the fuel is exhausted from the ram jet motors at extremely high temperatures, which if not utilized, as in the case of aircraft using such motors, makes this type of motor quite inefficient on an overall basis.

The rotary power generator embodied in the present invention provides for the production of increased amounts of usable power by compounding the power obtained at very high efficiencies from the ram jet motors, with the power obtained from the use of the exhaust heat at approximately the 34% overall efficiency found in conventional high grade steam-electric generating plants. Thus, the more power that may be developed from the ram jet motors at high efficiencies, with respect to the amount of the power obtained from the balance of the heat in the exhaust gases, the greater the total output of usable power that may be obtained from the compounding of the power outputs thereof, and the smaller and cheaper the entire installation will be for a specified power rating.

The rotary prime mover provided herein has no internal gears, nor off-centered rotors, nor reciprocating pistons, nor crankshaft. It burns fuel amid ample air and at a comparatively low temperature, and consequently its exhausts contain extremely small amounts of CO, $NO_x$, and other pollutants. It could also burn hydrogen, hydrogen peroxide, or other fuels. It may be built small enough to run a lawn mower, motorcycle, small fishing boat, or home generator, or large enough to power an airplane, a helicopter, or a rural power plant.

SUMMARY

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A rotary prime mover comprising: (A) a generally cylindrical casing, the casing including a forward, combustion-supporting air chamber fully within said casing, an aft, exhaust gas chamber fully within said casing, an axial air intake, means for drawing combustion-supporting air axially inwardly through said axial air intake into said forward combustion air chamber, an axial exhaust outlet, means for drawing exhaust gas into said aft exhaust gas chamber and for expelling said exhaust gas axially outwardly through said axial exhaust outlet, a longitudinally arranged shaft, and bearing means at each circular end thereof to support said longitudinally arranged shaft; (B) a flywheel block mounted on said longitudinally arranged shaft and arranged intermediate said air intake and said exhaust outlet between said forward, combustion-supporting air chamber and said aft, exhaust gas chamber, said longitudinal shaft having a fuel passage therethrough, said flywheel block having a main cylindrical section of slightly less diameter than the diameter of said generally cylindrical casing and lateral, frusto-conical ends which assist in the movement of air from said forward, combustion-supporting air chamber to said aft, exhaust gas chamber, said flywheel block being mounted for rotation with its main cylindrical section out of contact with said generally cylindrical casing; at least two balanced, diametrically-opposed jet reaction engines recessed within and secured within said main cylindrical section of said flywheel block, each said jet reaction engine being disposed along a chord of said main cylindrical section, each said jet reaction engine having its exhaust flowing along an imaginary extension of said chord of said cylindrical section of said flywheel block, and then being drawn towards said axial exhaust outlet, each jet reaction engine comprising (i) a hollow cylindrical housing, (ii) a cylindrical ignition head threadedly adjustably secured at one end of said housing for longitudinal adjustment into and out of said housing, said ignition head having an air inlet throat outwardly flared in the direction of air flow leading to a plurality of circumferentially disposed, longitudinally extending air inlet passages, and a central bore accommodating a longitudinally extending ignition device, (iii) an exhaust liner threadedly adjustably secured at the other end of said housing for longitudinal adjustment into and out of said housing, said liner having a central longitudinally extending cylindrical exhaust passage having an exhaust gas inlet throat inwardly flared in the direction of exhaust gas flow, (iv) the longitudinal adjustment of said cylindrical ignition head and said exhaust liner providing for placement of said ignition device a predetermined longitudinal distance from said combustible fuel mixture, to provide optimum ignition characteristics, and to control the volumetric size of said combustion chamber and allowing optimum ignition/combustion, (v) an annular fuel infeed zone, and (vi) a radial fuel inlet for admitting fuel to said annular fuel infeed zone; a fuel infeed line within said flywheel block connected between said radial fuel inlet to said fuel infeed zone and said fuel passage through said longitudinal shaft, said fuel infeed line including automatically actuated valve means therein; and a source of ignition power connected to said ignition device through said casing; (C) whereby operation of said jet reaction engines causes powered rotation of said flywheel block, so that power may be taken off said longitudinally arranged shaft.

2. The rotary prime mover of claim 1 wherein said longitudinal shaft is solid and is longitudinally centrally concentrically bored to accommodate a fuel passage therethrough.

3. The rotary prime mover of claim 1 wherein said automatically activated valve means comprises a spring biased ball valve.

4. The rotary prime mover of claim 3 wherein said casing includes upper and lower identical portions, each provided with at least two air inlet ports covered by air filter means, and at least two exhaust outlets, each connected to an associated exhaust pipe.

5. The rotary prime mover of claim 4 wherein said casing includes an outer housing and an inner heat-insulating casing, said casing including frusto-conical air inlets leading from said air inlet ports to the inlet side of said casing, and exhaust outlet ports leading from the exhaust side of said casing to said exhaust outlets.

6. The rotary prime mover of claim 5 including means protecting the bearings from the heat of the exhaust.

7. The rotary prime mover of claim 5 including fan means to draw air into said casing and to expel exhaust gas from said casing.

8. The rotary prime mover of claim 5 wherein a space is provided between said outer housing and said inner casing, thereby to maintain sound output levels to a minimum and to reduce transfer of heat between said inner casing and said outer housing.

9. The rotary prime mover of claim 1 wherein said flywheel block includes a fuel inlet bore, said bore containing a valve means therein, said valve means comprising a spherical ball maintained in position by a compression biasing spring.

10. The rotary prime mover of claim 1 wherein said flywheel block is secured to said longitudinal shaft by set screw means.

11. The rotary prime mover of claim 1 including O-rings to provide a fuel seal between said longitudinal shaft and said flywheel block.

12. The rotary prime mover of claim 1 wherein said fuel inlet includes a central longitudinal fuel passage in said solid longitudinal shaft, and at least two fuel passages extending radially outwardly from said central longitudinal fuel passage and transversely through said solid shaft to an associated coextensive fuel passage extending radially within said flywheel block to an associated well within which an associated jet reaction engine is secured.

13. The rotary prime mover of claim 12 wherein each said coextensive fuel inlet passage includes a small diameter bore leading to a larger diameter bore adjacent said well, said larger diameter bore containing a ball valve means and a valve control compression spring.

14. The rotary prime mover of claim 1 wherein said well includes a circumferential abutment ledge to retain the forward input end of said jet reaction engine.

15. The rotary prime mover of claim 1 wherein said ignition means includes a spark or glow plug connected by a whisker wiper electrode to an electrical contact wiper on the inner circumference of the casing.

16. The rotary prime mover of claim 15 wherein said electrical contact wiper comprises a slip ring within said casing.

17. The rotary prime mover of claim 1 wherein, in said jet reaction engine, said ignition head has an outwardly flared air inlet throat, and the interior of said central bore of said ignition head flares outwardly; said exhaust liner has an outwardly flared exhaust gas inlet throat; said fuel infeed zone is a cylindrical annular zone disposed between the internal wall of said cylindrical housing and the external wall of said exhaust liner; and said combustion zone extends between said ignition device at the outwardly flared bore of said ignition head, and said outwardly flared exhaust inlet throat of said exhaust liner.

* * * * *